United States Patent

Burrows

[15] 3,683,956
[45] Aug. 15, 1972

[54] APPARATUS FOR WATERING ANIMALS

[72] Inventor: Robert K. Burrows, Route 1, Havana, Ark. 72842

[22] Filed: May 27, 1970

[21] Appl. No.: 40,869

[52] U.S. Cl. ................................................137/408
[51] Int. Cl. ............................................F16k 21/16
[58] Field of Search ................137/403, 408; 119/81

[56] References Cited

UNITED STATES PATENTS

| | | | |
|---|---|---|---|
| 1,702,973 | 2/1929 | Lord | 137/408 X |
| 1,131,046 | 3/1915 | Dyer | 119/81 |
| 3,275,026 | 9/1966 | Godshalk | 137/408 |
| 2,632,463 | 3/1953 | Martin | 137/408 |
| 2,641,276 | 6/1953 | Suter | 137/408 |
| 3,398,927 | 8/1968 | Ruter | 137/408 X |

Primary Examiner—M. Cary Nelson
Assistant Examiner—David R. Matthews
Attorney—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

[57] ABSTRACT

A water valve and an animal waterer incorporating that valve. A water inlet pipe terminates in an upwardly extending outlet, and a closure mechanism is resiliently supported above the outlet and in turn supports a water retainer. When water is in the retainer to the desired level, the closure mechanism is held against the water outlet, cutting off the flow of water. When the water is below the desired level, the resiliently supported closure mechanism lifts, permitting water to flow from the inlet pipe to the retainer until the desired level is again reached.

1 Claim, 3 Drawing Figures

Patented Aug. 15, 1972

3,683,956

INVENTOR
ROBERT K. BURROWS

BY McLean, Morton & Doustead

ATTORNEYS

APPARATUS FOR WATERING ANIMALS

The present invention pertains to a watering device. More particularly, the present invention pertains to a water valve and to a device by which animals can be continuously provided with a supply of fresh water.

Livestock continually need fresh drinking water. This is true of all livestock, and while those such as cattle and horses, which are kept in the open, may be able to obtain water from such sources as streams and ponds, other provisions must be made for livestock kept in enclosures, such as poultry, cats, dogs, and rabbits, both those which are kept as pets and those which are raised for commercial purposes. In particular, in commercial operations, it is desirable to have means for automatically providing the livestock with water so that it will not be necessary for an attendant to be present to take care of the supply of water. By way of example, in large scale commercial poultry raising operations a hen house often has several thousand chickens within it. For a person to have to ensure that water is always available for the chickens would entail a considerable amount of work. It is not desirable to leave a large supply of water sitting in a trough for the chickens, not only because the water loses its freshness over a period of time, but also because the relatively small height of chickens and other such small livestock necessitates the use of a low receptacle, and therefore to ensure an adequate quantity of water for a long period of time would require a watering trough covering a large area. Alternatively, a water spigot could be left running to ensure a continuous supply of fresh water; however, this obviously wastes a considerable amount of water and creates a messy condition and thus is undesirable. Similar provisions must be made for larger animals such as cattle and horses when they are kept in enclosures, for example at night and during inclement weather.

The present invention is a water valve and an automatic watering device incorporating that valve and capable of continually making available a quantity of fresh water for such use as the watering of livestock. The present invention can readily be connected to any available source of water and includes a water inlet pipe terminating in an upwardly extending end and having attached thereto a support member. A closure mechanism is resiliently supported by the support member and in turn supports a water retainer. When the desired amount of water is present in the water retainer, the closure mechanism contacts the upwardly extending end of the water inlet pipe, shutting off the water flow therefrom. Should the water in the retainer fall below the desired amount, the resiliently supported closure mechanism rises, unblocking the water inlet pipe and permitting water to enter the retainer until the desired amount is again reached. In a more general aspect the present invention concerns the water source closure mechanism including the upwardly extending water inlet pipe, the resiliently supported closure mechanism and the water retainer which permit water from the inlet pipe to enter the retainer to the desired quantity, at which point the closure mechanism is caused to contact the inlet pipe, blocking flow therefrom.

These and other aspects and advantages of the present invention are more apparent in the following detailed description and claims, particularly when considered in conjunction with the accompanying drawings in which:

Figure 1:
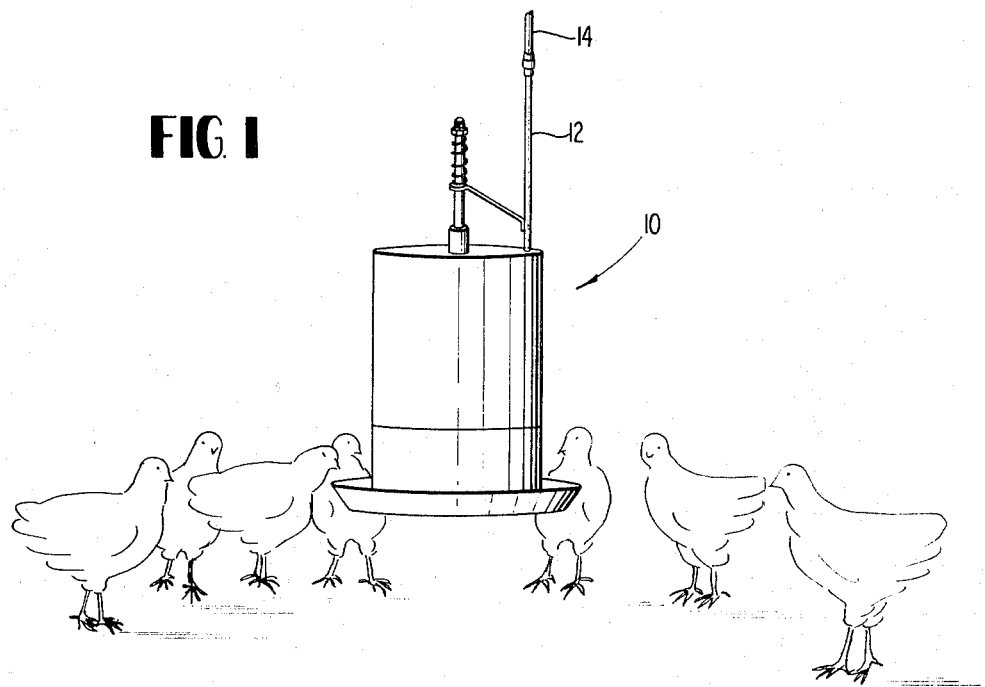
FIG. 1 is a perspective view of a watering device in accordance with the present invention in use.

FIG. 1 depicts the interior of an animal enclosure such as a hen house with a large number of chickens therein. Watering device 10 is located within the hen house to provide a continuous supply of fresh water for the chickens. Water inlet pipe 12 of watering device 10 is connected within the hen house to a source of water, such as water pipe 14. While having inlet pipe 12 bent so that its connection to water source 14 is substantially above the center of watering device 10 results in device 10 hanging in a more stable manner from water source 14, pipe 12 can be straight with the connection to water source 14 being over one side of watering device 10, if desired. Inlet pipe 12 can be connected to water pipe 14 in any suitable manner, for example by means of a threaded connection, or alternatively if water pipe 14 terminates in a rubber hose, by means of a clamp. Other suitable connections might be provided.

Figure 2:
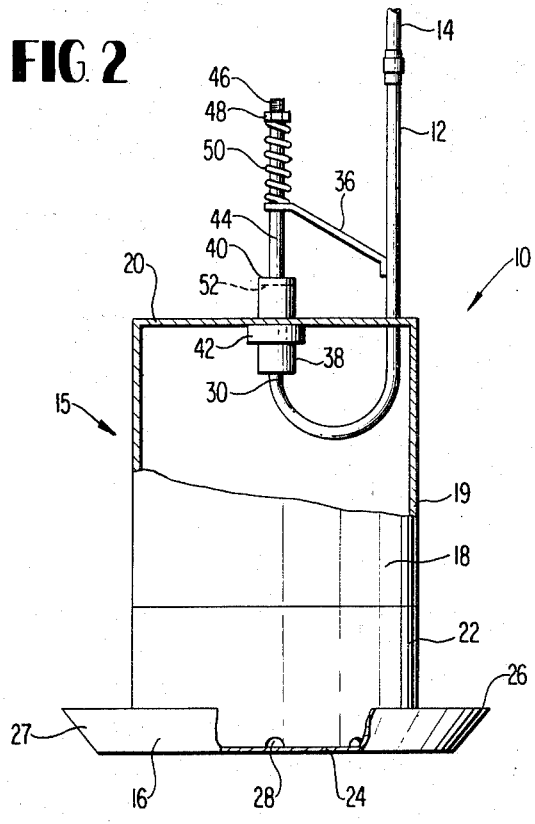
FIG. 2 is a side elevational view, partially broken, of a watering device in accordance with the present invention.

Body 15 of watering device 10 is illustratively depicted in FIG. 2 as including bottom member 16 and top member 18. Top member 18 is a hollow cylinder having cylindrical sidewall 19 and a closed top 20. Bottom member 16 includes a cylindrical portion 22 which mates with cylindrical sidewall 19 and, for example, might be threadedly connected thereto. Bottom member 16 and top member 18 can be of any suitable material such as metal or a natural or synthetic resin. Having bottom member 16 and top member 18 formed separately and connected together results in easy assembly and cleaning of watering device 10, but body 15 could be formed as a single piece, for example of blown plastic. Bottom member 16 includes base 24 which not only extends beneath cylindrical portion 22 to close the bottom thereof, but also extends a short distance outwardly from cylindrical portion 24 and terminates in upwardly extending flange 26 to define a water retaining tray 27. One or more openings 28 is provided through the sidewall of cylindrical portion 22 adjacent base 24 to permit fluid communication between the interior of body 15 and the water retaining tray 27.

Figure 3:
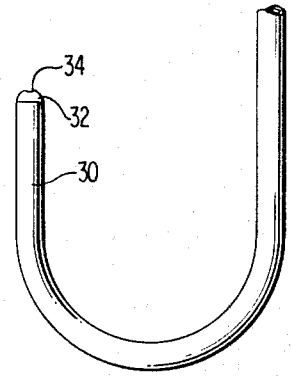
FIG. 3 is a fragmentary elevational view of a water inlet pipe suitable for use in the present invention.

As best seen in FIG. 3, water inlet pipe 12 terminates in upwardly extending end portion 30. If desired, end portion 30 can terminate in an upwardly tapered cap 32 having a small outlet 34 at the raised center thereof. Outlet 34 is of a diameter substantially less than the diameter of water inlet pipe 12.

As seen in FIG. 2, water inlet pipe 12 passes through top 20 of top member 18. Outside of body 15 support member 36 is connected to the side of water inlet pipe 12 and extends over the upwardly extending end portion 30 of pipe 12. The outlet of water inlet pipe 12 is situated within closure mechanism 38 which, for example, can be a hollow cylindrical pipe having its upper end 40 closed. Closure mechanism 38 likewise passes through top 20 of top member 18. Retaining device 42 is connected on the lower portion of closure mechanism 38 and, for example, might be threaded thereon. Retaining device 42 supports top 20 of top member 18 and thus also supports bottom member 16. If desired a second retainer can be threadedly connected on closure mechanism 38 just above top 20 to hold top member 18 more securely thereto. Rod 44 extends upwardly from the closed upper end 40 of closure mechanism 38 and passes through an opening in support member 36. The upper end 46 of rod 44 is threaded, and nut 48 is mounted thereon. Resilient spring 50 encircles rod 44 between support member 36 and nut 48.

When watering device 10 is initially installed as depicted in FIG. 1, spring 50 acts against nut 48 and support member 36 to hold the device in a position determined by the tension of spring 50 and the adjustment of nut 48 on threaded end 46. Water from source 14 passes through inlet 12 and into the interior of body 15 until the quantity of water in the retainer of device 10 is sufficient that its weight overcomes the bias of spring 50, thus causing body 15 to move downwardly with respect to water inlet 12. As a consequence, the discharge end of water inlet 12 contacts the upper inner portion of closure mechanism 38, shutting off the water flow. If desired, this upper inner surface of closure mechanism 38 can include a resilient layer 52 of, for example, rubber to aid in shutting off the water. Cap 32 contacting such a resilient surface results in outlet 34 being fully blocked so that the water flow is completely stopped. When the water level has dropped because of the consumption of water from tray 27 by the livestock or because of evaporation or spillage, spring 50 raises upper member 18 and closure mechanism 38 to permit water to flow into the watering device until it has again reached the desired level. The level of water at which the water flow is cut off can be controlled by adjusting nut 48.

While FIG. 1 depicts watering device 10 suspended from a downwardly extending water pipe 14, it is not necessary that the water pipe be downwardly extending, so long as a suitable water inlet 12 can be connected to the water pipe and can terminate in an upwardly extending outlet end 30 with support member 36 thereabove. Likewise the apparatus could be used in similar applications with liquids other than water. Thus, although the present invention has been described with respect to a preferred embodiment, numerous modifications or rearrangements can be made, and still the result would come within the scope of the invention.

What is claimed is:

1. An apparatus for providing a fresh supply of water to small animals on a ground surface, said apparatus comprising:
   a. a water retaining body including:
      i. a bottom member having a first cylindrical sidewall and a bottom surface including a closure surface connected to and beneath said first cylindrical sidewall, a tray surface extending outwardly from said first cylindrical sidewall, and an upwardly extending flange about said tray surface to form a water retaining tray, said first cylindrical sidewall having openings therethrough adjacent said bottom surface to permit water flow from the interior of said first cylindrical sidewall to said water retaining tray; and
      ii. a top member having a top surface and a second cylindrical sidewall connected to said top surface and detachably connected to said first cylindrical sidewall to form a substantially closed water retaining body;
   b. a water inlet pipe having an inlet end adapted for connection to a source of water for receipt of water therefrom and having an upwardly extending discharge end terminating in an upwardly tapered cap with an outlet opening at substantially the center thereof for discharge of water, said water inlet pipe passing through said water retaining body top member top surface adjacent the connection of said top surface and said second cylindrical sidewall with said water inlet pipe inlet end above said top surface and said water inlet pipe discharge end within said water retaining body and adjacent substantially the center of said top surface;
   c. a support member connected to said water inlet pipe outside said water retaining body and extending over substantially the center of said top surface;
   d. a hollow cylindrical closure pipe connected to substantially the center of said water retaining body top member top surface with its longitudinal axis substantially vertically disposed and having a closed upper end with a layer of resilient, liquid impervious material on the inner surface thereof, said hollow cylindrical closure pipe surrounding said water inlet pipe discharge end; and
   e. a resilient coupling member connected to substantially the center of the said water retaining body top member top surface and resiliently coupling said water retaining body and said support member with said water inlet pipe upwardly extending discharge end within said closure pipe so that the presence in said water retaining body of at least a preset amount of water urges said water retaining body downwardly against the resilient urging of said resilient coupling member to cause said closure pipe to close said water inlet pipe discharge end, shutting off water flow therefrom, while the presence in said water retaining body of less than the preset amount of water permits said resilient coupling member to urge said water retaining body upwardly against the downward urging of the water to cause said closure pipe to move away from said water inlet pipe discharge end an amount sufficient to permit water flow therefrom, said resilient coupling member including adjustment means for adjusting the preset amount of water required to cause said closure pipe to close said water inlet pipe discharge end,
   whereby, with said water inlet pipe inlet end connected to a source of water above said water retaining body, the passage of said water inlet pipe through said water retaining body top member top surface and the placement of said water inlet pipe upwardly extending discharge end within said closure pipe cooperate to support said water retaining body stably above a ground surface without contact from the ground surface.

* * * * *